United States Patent [19]

Case

[11] Patent Number: 5,519,095
[45] Date of Patent: May 21, 1996

[54] ADHESIVE FORMULATION

[75] Inventor: Peter J. Case, East Greenbush, N.Y.

[73] Assignee: Norton Company, Worcester, Mass.

[21] Appl. No.: 332,199

[22] Filed: Oct. 31, 1994

[51] Int. Cl.$^6$ ..................................................... C08G 18/32
[52] U.S. Cl. ............................. 525/440; 525/453; 528/76; 528/83
[58] Field of Search ..................................... 525/440, 453; 528/76, 83

[56] References Cited

U.S. PATENT DOCUMENTS 4,937,307   6/1990   Chung ........................................ 528/76

Primary Examiner—Irina Zemel
Attorney, Agent, or Firm—David Bennett

[57] ABSTRACT

This invention provides a method of forming a joint in an abrasive belt using a novel joint adhesive comprising a polyesterurethane, a cross-linking agent and a reactive polyol solvent.

5 Claims, No Drawings

ADHESIVE FORMULATION

BACKGROUND OF THE INVENTION

The present invention relates to adhesive formulations and aparticularly to adhesive formulations useful in the field of coated abrasives and to coated abrasives made using such adhesives.

Coated abrasive materials are usually produced in large rolls from which the desired commercial product is cut by an automated process. One of the most useful forms of coated abrasive is in the form of a belt. Because of the conventional manufacturing process, each such belt must be produced from a strip of suitable dimensions with the ends of the strip joined together to make a continuous loop. This may be done by profiling each end such that, when overlapped and joined, the belt has a substantially uniform cross-sectional thickness across the joined area. This is known as a "lap" joint. Alternatively both ends of the strip to be joined to form the belt may be hollowed on the non-abrasive-bearing surface to accomodate a joining strip that is bonded to each of the hollowed ends. This is known as a "butt" joint.

The material of the backing on which the abrasive material is carried can be a woven or non-woven fabric, a plastic film or sheet or a paper of suitably durability.

To form the joint it is conventional to prepare the ends by treating them to ensure that the adhesive penetrates and bonds firmly to the substrate. This is particularly important if the backing has been given a substantial backfill treatment. Where the backing is a fabric, the ends may be sandblasted to open up the exposed fiber ends and allow penetration of the adhesive in to the material of the backing.

The adhesive used must meet very demanding standards to ensure that the joint remains intact throughout the useful life of the belt. This is important since a sudden joint failure while the belt is in use could be very dangerous to both the machine and the operator.

Suitable adhesives for this demanding application are described for example in U.S. Pat. Nos. 3,154,897 and 3,763,604. There are however many others that have been proposed. It is known for example that a particularly suitable adhesive for joining abrasive belt ends is based on an aqueous solution of a polyesterurethane such as is described in U.S. Pat. No. 5,256,227, in conjunction with a crosslinking agent.

The adhesive formulations of the prior art are typically applied to the prepared ends and (in the case of a butt joint) also to the joint tape used to make the link between the ends. The pre-treated joint tape needs to be kept refrigerated until just before use because at room temperature the adhesive will begin to crosslink and the tape will become useless often after only one to two hours. After the adhesive has been applied it is allowed to stand for a minimum of about 30 minutes at room temperature before being placed in a heated press for 8–10 seconds to form the joint. Because the adhesive begins to cure quite quickly, it cannot be pre-mixed in bulk more than one or two hours before the time of expected use. If a pre-treated tape is used, this must be kept refrigerated to ensure that crosslinking is not advanced by the time the tape is to be used.

The consequence is that the joining of belts is a bottle neck in the belt production operation and is adaptable to only a limited amount of mechanization. Most of the work in fact has to be done by hand by skilled operators.

An adhesive formulation has now been discovered that is highly effective, requires no dwell time before going into the hot press and which can be rapidly cured in minutes or less without resulting in inadequate bonding. The formulation can be used with a dry tape, (that is, a tape that has not been pre-treated). The formulation is therefore well-adapted to use in a fully automated operation not requiring on-the-spot refrigeration facilities.

GENERAL DESCRIPTION OF THE INVENTION

The present invention provides an adhesive formulation comprising a polyesterurethane, a crosslinking agent and a reactive polyol solvent which is a liquid capable of dissolving both the polyesterurethane and the crosslinking agent at the application temperature and of reacting with the crosslinking agent at that temperature.

The invention also comprises a method of joining two ends of an abrasive strip which comprises applying an adhesive formulation comprising a polyesterurethane, a crosslinking agent and a reactive polyfunctional polyol solvent which is a liquid capable of dissolving both the polyesterurethane and the crosslinking agent at the bonding temperature and of reacting with the crosslinking agent at that temperature, and allowing the formulation to cure. The usually preferred technique for making the joint involves the use of a jointing tape that has been pretreated with the adhesive formulation and is applied to the treated ends as in the formation of a typical butt-end joint. A solution of the polyesterurethane, the crosslinking agent and the catalyst, dissolved in the polyfunctional polyol solvent is then used to treat the ends and the tape. This relatively lower viscosity formulation penetrates the fibers exposed by the pre-treatment and partially dissolves the adhesive formulation in the tape. The joint is then placed in a heated press to complete the formation of the bond. Upon application of heat the crosslinking agent reacts with the polyesterurethane and the reactive solvent to form the polymer bond. Because there is little or no non-reactive solvent in the formulation, there is no significant delay required to allow the solvent to escape. This means that the joint can be formed "on-line" with only seconds required to complete the operation to the point at which the belt can be removed from the press. Indeed the reaction between the polyesterurethane and the isocyanate is so rapid that it may be desirable to add some small amount of solvent to slow the reaction, lower the viscosity and/or aid in wetting the fibers of the backing.

DETAILED DESCRIPTION OF THE INVENTION

The polyesterurethane component of the formulation according to the invention can be any one of those commonly used to produce urethane-based adhesives. Such polyesterurethanes have softening points below the temperature at which the joint is to be formed and should desirably be soluble in the polyfunctional polyol to the degree necessary to yield a solution with a solids content of at least 25% and preferably at least 30% and more preferably still at least about 50%. Typical polyesterurethanes include the Desmocoll series of products available from Mobay Corporation and derivatives of such products including the Dispercoll series of products where these have softening points in the desired range. Particularly preferred polyesterurethanes are available from Mobay Corp under the registered trademark "Desmocoll" with the product identifier "176". Other Desmocoll products that may be used are sold with the identifiers "510 S-HV", "530", "530 HV", "540", "540 HV", "110", "130", 130M", "400" and "406".

The key component of the novel formulations of the invention is the polyfunctional polyol solvent. By acting not only as a solvent but also taking part in the polymerization reaction by which the formulation cures, it removes the need for any waiting period in which the solvent is removed before cure can be completed.

The presence of a non-reactive solvent is found to slow the pace of the cure reaction. It may be desirable, in the case of fast acting combinations, to add a small amount of a conventional solvent, such as methyl ethyl ketone (MEK) or ethyl acetate (EA), to allow the adhesive to be properly located before cure makes this impossible. Thus the solvent may aid the formulation to penetrate into the fibers of the ends to be joined either by acting as a wetting agent and/or simply by lowering the viscosity of the formulation.

The function of dissolving the polyesterurethane component is however carried out by the polyfunctional polyol which term is understood to indicate a polyalkylene oxide polymer or copolymer that is a liquid at the temperature at which the adhesive formulation is produced and also at the temperature at which it is applied. In general such polyols have a molecular weight between about 300 and about 3,000, (preferably from about 400 to about 2800), and have a hydroxyl number of at least 30, (preferably from about 40 to 350), expressed interms of equivalent mg. of KOH per gram of the polyol. The polyol can have any desired functionality but in general di- and tri-functional polyols are preferred. The viscosity of the polyol at 38° C. is preferably from about 100 to about 400 and more preferably from about 100 to 200 cp. However it should be noted that the higher viscosity materials can be readily used if the viscosity is reduced by a suitable solvent addition.

Suitable polyfunctional polyols include polyethylene oxide/polypropylene oxide copolymers that are sold under the registered trademark, "Texox". These materials are sold as "functional fluids" for applications as diverse as lubricants, heat transfer fluids, plasticizers, solder removers and defrothing agents. Particularly preferred are the Texox products identified as WL-440, WL-590 and WL-1400 which are, respectively, tri-, tri- and di-functional.

The properties of these materials, as published by the manufacturer, Texaco Chemical company are as follows:

| PROPERTIES | WL-440 | WL-590 | WL-1400 |
| --- | --- | --- | --- |
| FUNCTIONALITY | tri- | tri- | di- |
| MOLECULAR WT. (wt. average) | 488 | 990 | 2500 |
| OH Number, mg KOH/gm | 344 | 172 | 45 |
| VISCOSITY, cp AT 38° C. | 115 | 137 | 334 |
| POUR POINT | −32° C. | −18° C. | 10° C. |
| FLASH POINT, COC | 305° C. | 285° C. | 246° C. |
| FIRE POINT, COC | 338° C. | 316° C. | 288° C. |

As will be appreciated, the use of WL-1400 or other polyol of comparable viscosity may require addition of some compatible organic solvent such as MEK to reduce the viscosity to a level suitable for the present application. However lower viscosity polyols may also benefit from the addition of a solvent because they tend to react somewhat faster than those with greater viscosities and the addition of solvent has the effect of moderating the reaction speed. Whenever a solvent is added however, care must be taken to avoid an excessive amount as this can cause blistering in the hot press. Generally amounts less than 35% by volume can be used without leading to blistering and amounts of 5–10% by volume are generally most preferred where it is desirable to use any solvent at all. Lower viscosity polyols are generally preferred because a larger amount of the polyesterurethane component can be dissolved while still retaining a low viscosity at a reasonable application temperature.

The crosslinking agent can be any of the polyisocyanates having two or more functional groups commonly used in the polyurethane art for this purpose. These include, in addition to conventional crosslinking agents such as methylene diisocyanate, tetramethylene diisocyanate, toluene diisocyanate (TDI), methylene diphenylene diisocyanate (MDI) and the like, the reaction product of such a diisocyanate with a polymer having functional groups reactive with isocyanate groups to form a so-called "isocyanate prepolymer". These act to modify the polymer properties, generally in the direction of making them more flexible.

The amount of the isocyanate added to the polyol should preferably be sufficient to give an hydroxyl to isocyanate group ratio of from about 1:1 to 1:15 with ratios of from about 1:8 to 1:10 being generally more preferred.

The catalyst used can be any one of those normally used for such polyurethane reactions. Typical catalysts are tin soaps, alkali metal soaps and tertiary amines.

DESCRIPTION OF SPECIFIC EMBODIMENTS

The invention is now described with reference to specific examples which are for the purpose of illustration only and are intended to imply no essential limitation of the scope of the invention.

EXAMPLE 1

This Example describes the production of certain adhesive formulations and their use to form belt joints.

The materials used were as follows:

| | |
| --- | --- |
| Polyfunctional polyol | Texox 590 |
| Polyesterurethane | Desmocoll 176 (Mobay) |
| Crosslinker | MP 102 (BASF) |
| Catalyst | T-12 and DABCO TAC |

The proportions used were as follows:

| | Wt. Ratio (176:590) | Index* | ISO** |
| --- | --- | --- | --- |
| Formulation 1 | 1:1 | 5 | 4.3 |
| Formulation 2 | 3:7 | 5 | 5.9 |

*the ratio of OH groups to NCO groups
**the number of grams of the isocyanate needed to be added to each 6 gm of the 176/590 mixture to give the "index" in the previous column. It should be noted that the 176 component also comprises some hydroxyl functionality.

One drop of each of the catalysts was used for every 3 gm of the 176/590 mixture.

The above formulations were used to produce a butt joint joining belt segments cut from a commercial Norton Company R823 60 grit belt. The ends to be joined were sand blasted and brushed with 100 grit paper to give a suitably open surface with the fibers of the belts separated in the joint region.

The ends were treated with the above formulations and a reinforced joint tape was similarly treated. The joint was made by placing the ends together with the joint tape bridging the two ends in a press with the upper and lower platens kept at about 93° C. under a contact pressure of 500 GPSI for 60 seconds.

The joints made as described above were tested in a triple head tester using a 9.5 mm mandrel and under about 12.7 kg tension. The results were as follows:

|  | RATIO | IN-DEX | HEAD 1 | HEAD 2 | HEAD 3 | AVG. |
|---|---|---|---|---|---|---|
| FORM. 1 | 1:1 | 5 | 34.2 | 11.1 | 12.5 | 19.3 |
| FORM. 2 | 7:3 | 5 | 30.6 | 13.6 | 20.2 | 21.5 |

Since a value of above 10 is ususally considered satisfactory under the above test conditions, the above formulations performed very well indeed.

EXAMPLE 2

This example describes the use of different ratios of the same Desmocoll 176 and Texox WL-590 in a joint forming test as described in Example 1. The joint formed was evaluated in the same manner as described in that example.

A mixture of 30 parts of Desmocoll 176 with 70 parts of Texox WL-590 was formed. Both components were waxy solids at room temperature but the mixture was a low viscosity liquid at above about 90° C. However, since at this temperature the reaction rate was found to be too great, a small amount of methyl ethyl ketone was added. This had the effect of reducing the reaction rate and improving the ability of the mixture to wet and penetrate the fibres.

The same isocyanate component as was used in Example 1 was added in an amount that corresponded to 23.8 gm for every 6 gm. of the mixture. This resulted in an index of 10. The same catalyst combination was used in the same amounts.

When duplicate tests were run on a triple head tester as described in Example 1, the results obtained were as follows:

|  | HEAD 1 (min.) | HEAD 2 (min.) | HEAD 3 (min.) |
|---|---|---|---|
| RUN 1 | 31.3 | 56.3 | 18.6 |
| RUN 2 | 55.3 | 126.7 | 51.5 |

The average result was 56.6 minutes. This is a truly outstanding result.

From the above it will be clear that the above combination of a polyesterurethane with a reactive polyfunctional polyol and an isocyanate can produce a jointing adhesive with the capability to form very effective joits in a very short time by comparison with the techniques currently used in the art.

What is claimed is:

1. An adhesive composition which comprises a polyesterurethane, a crosslinking agent and a reactive polyol solvent selected from alkylene oxide polymers or copolymers having a weight average molecular weight of from about 300 to about 3,000 and a hydroxyl number of at least 30, said solvent being a liquid capable of dissolving both the polyesterurethane and the crosslinking agent at a temperature below of about 100° C. and of reacting with both at that temperature.

2. An adhesive formulation according to claim 1 comprising a solution of the polyesterurethane in the reactive polyol solvent wherein from about 30 to about 75% of the combined weight is provided by the polyesterurethane.

3. An adhesive formulation according to claim 1 in which the crosslinking agent is a polyisocyanate.

4. An adhesive formulation according to claim 1 in which the polyisocyanate is present in an amount sufficient to give an hydroxyl to isocyanate group ratio in the formulation of from about 1:1 to about 1:15.

5. An adhesive formulation which comprises a polyesterurethane, a polyisocyanate crosslinking agent and a polyethylene oxide/polypropylene oxide copolymer solvent which has a viscosity at 38° C. of from about 100 to 200 cp and an hydroxyl number of from about 40 to about 350, the components being present in amounts necessary to give an hydroxyl to isocyanate ratio of from about 1:5 to about 1:10 and a weight ratio of solvent to polyesterurethane of from about 3:1 to about 1:1.

* * * * *